March 5, 1968
S. H. NEWMAN
3,371,507
CIGARETTE LIGHTER
Filed Oct. 23, 1965
13 Sheets-Sheet 1
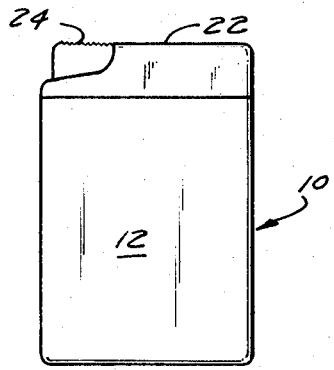
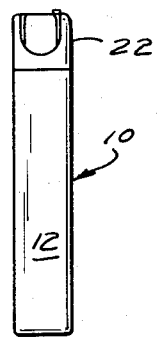
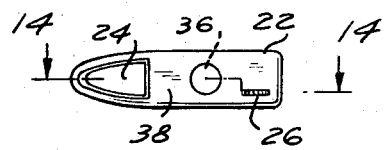
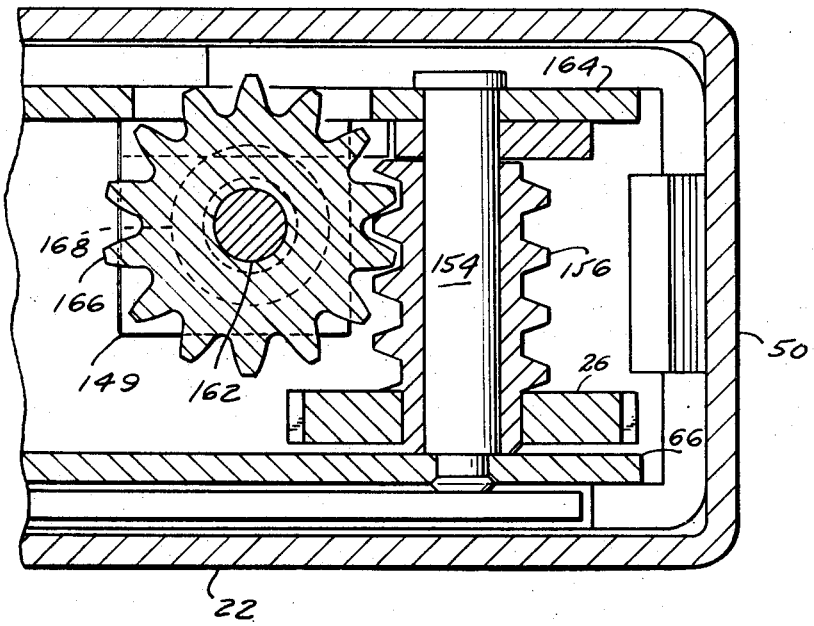
INVENTOR.
STANLEY H. NEWMAN
BY
Curtis, Morris & Safford
ATTORNEYS March 5, 1968 S. H. NEWMAN 3,371,507
CIGARETTE LIGHTER
Filed Oct. 23, 1965 13 Sheets-Sheet 2
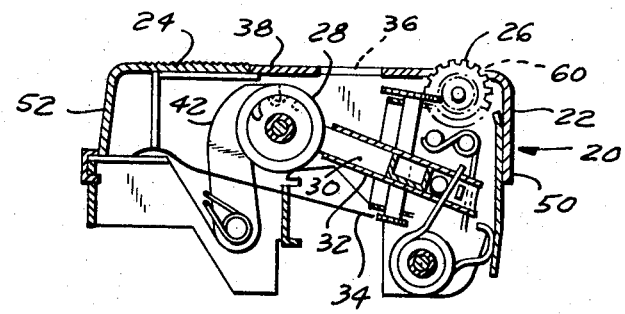
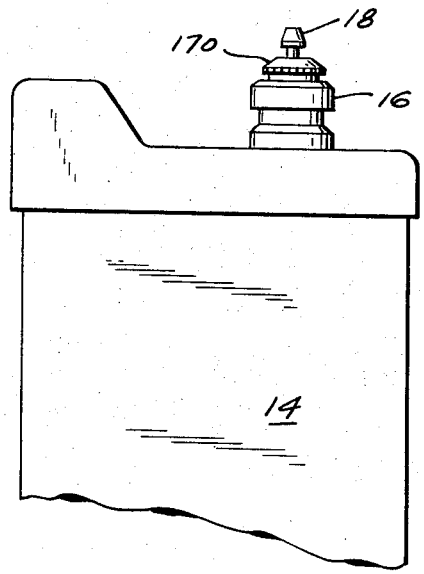
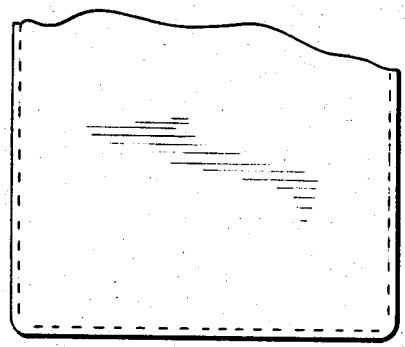
INVENTOR.
STANLEY H. NEWMAN
BY
ATTORNEYS

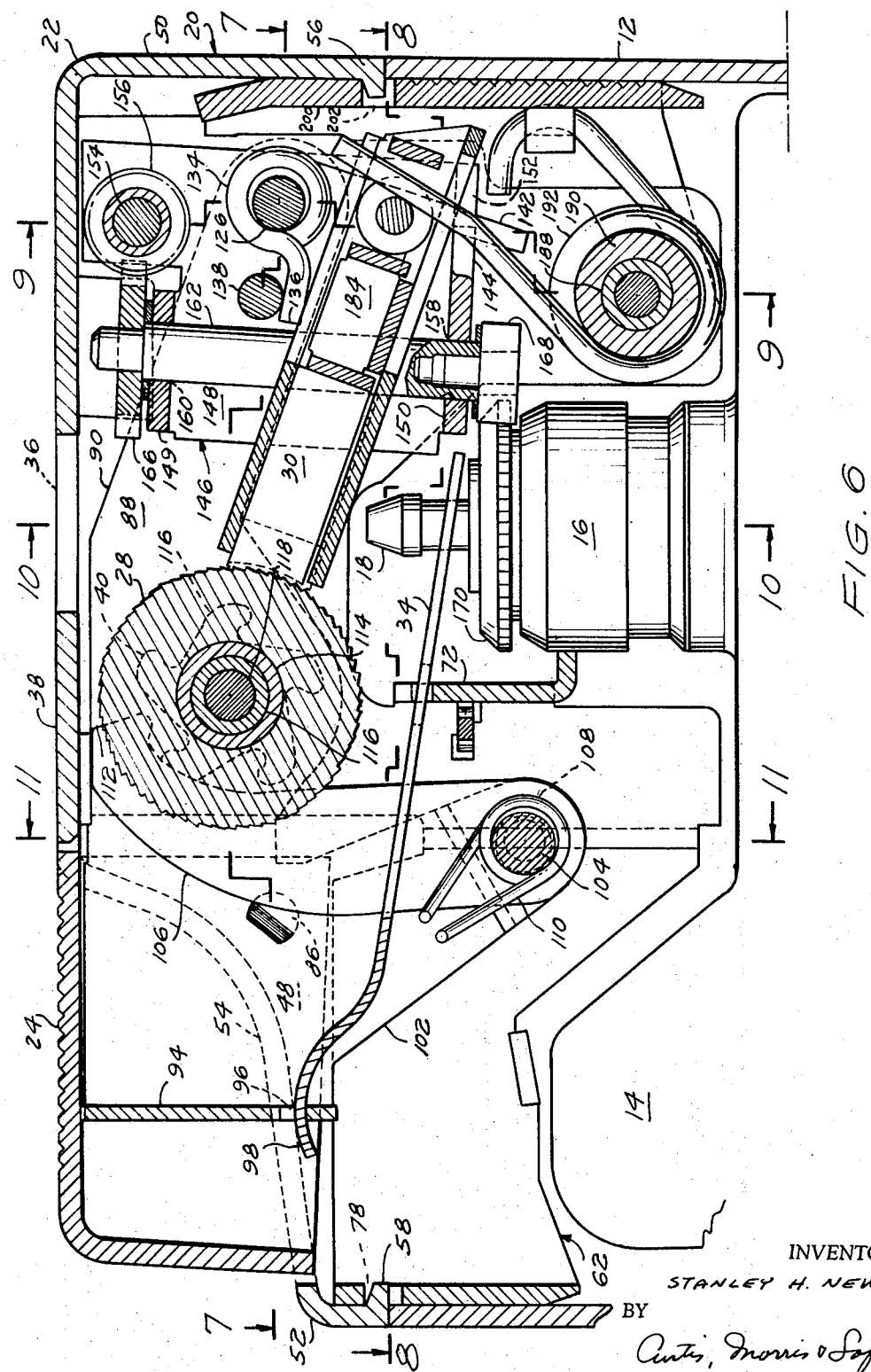

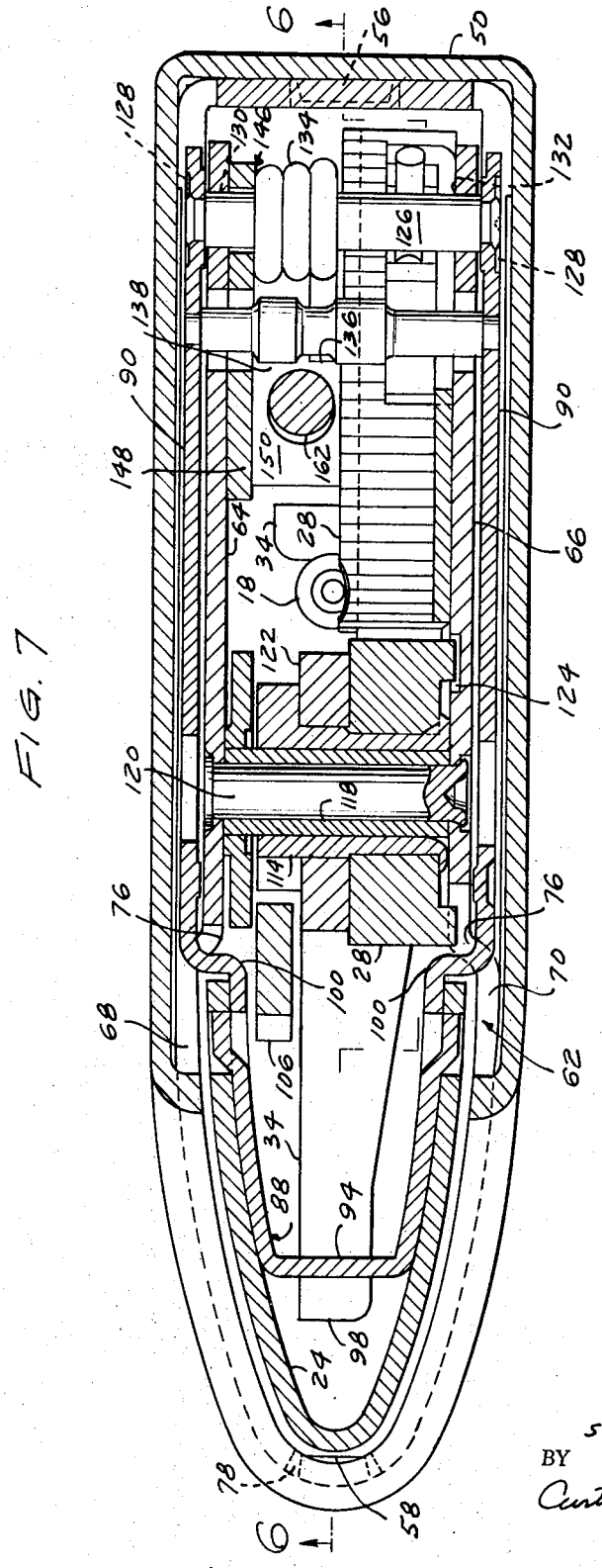

March 5, 1968 S. H. NEWMAN 3,371,507
CIGARETTE LIGHTER

Filed Oct. 23, 1965 13 Sheets-Sheet 5

INVENTOR.
STANLEY H. NEWMAN
BY
ATTORNEYS

March 5, 1968 S. H. NEWMAN 3,371,507
CIGARETTE LIGHTER

Filed Oct. 23, 1965 13 Sheets-Sheet 6

INVENTOR.
STANLEY H. NEWMAN
BY
ATTORNEYS

March 5, 1968  S. H. NEWMAN  3,371,507
CIGARETTE LIGHTER

Filed Oct. 23, 1965  13 Sheets-Sheet 8

INVENTOR.
STANLEY H. NEWMAN
BY
*Curtis, Morris & Safford*
ATTORNEYS

March 5, 1968 S. H. NEWMAN 3,371,507
CIGARETTE LIGHTER

Filed Oct. 23, 1965 13 Sheets-Sheet 9

INVENTOR.
STANLEY H. NEWMAN
BY
ATTORNEYS

March 5, 1968  S. H. NEWMAN  3,371,507
CIGARETTE LIGHTER

Filed Oct. 23, 1965

INVENTOR.
STANLEY H. NEWMAN
BY
Curtis, Morris & Safford
ATTORNEYS

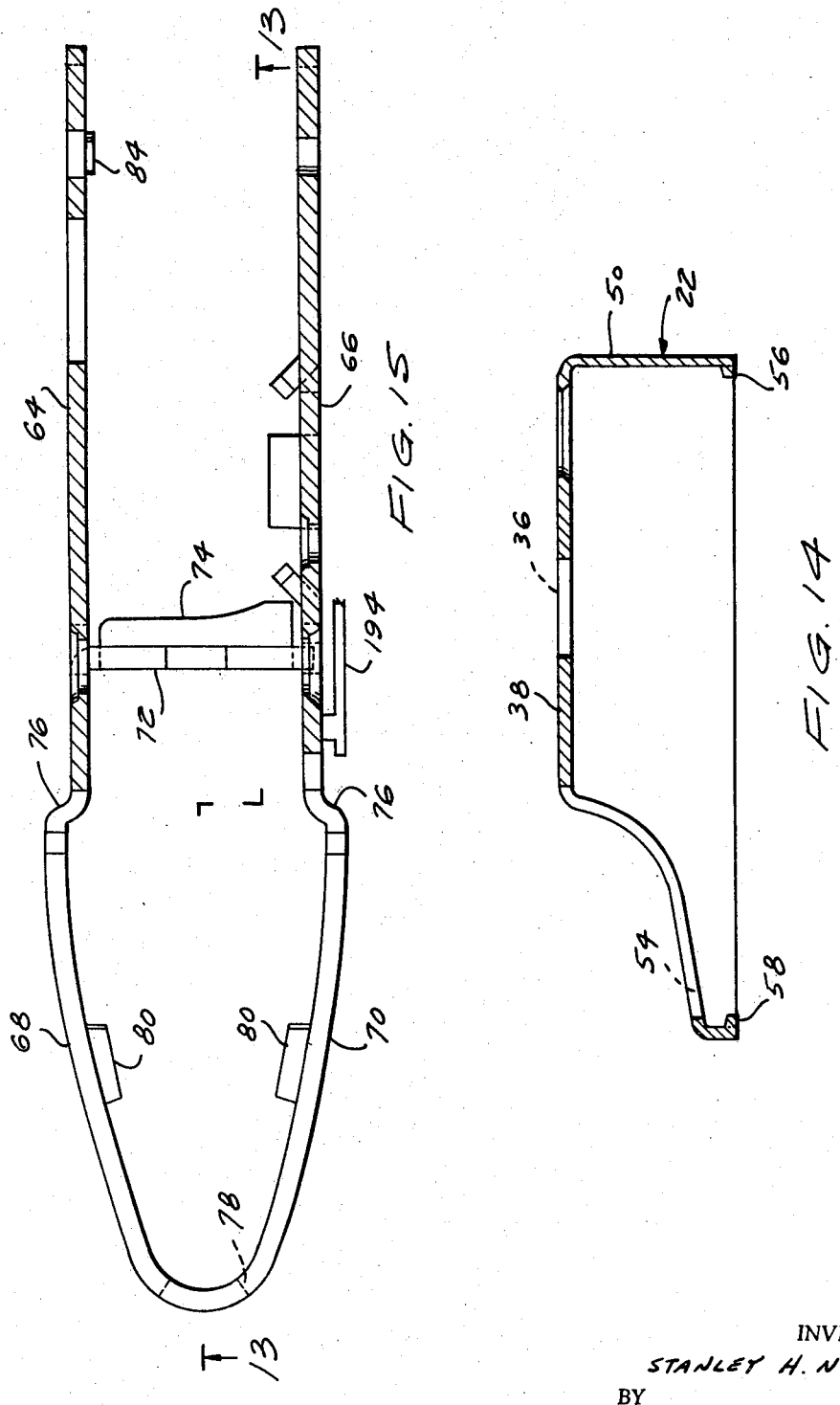

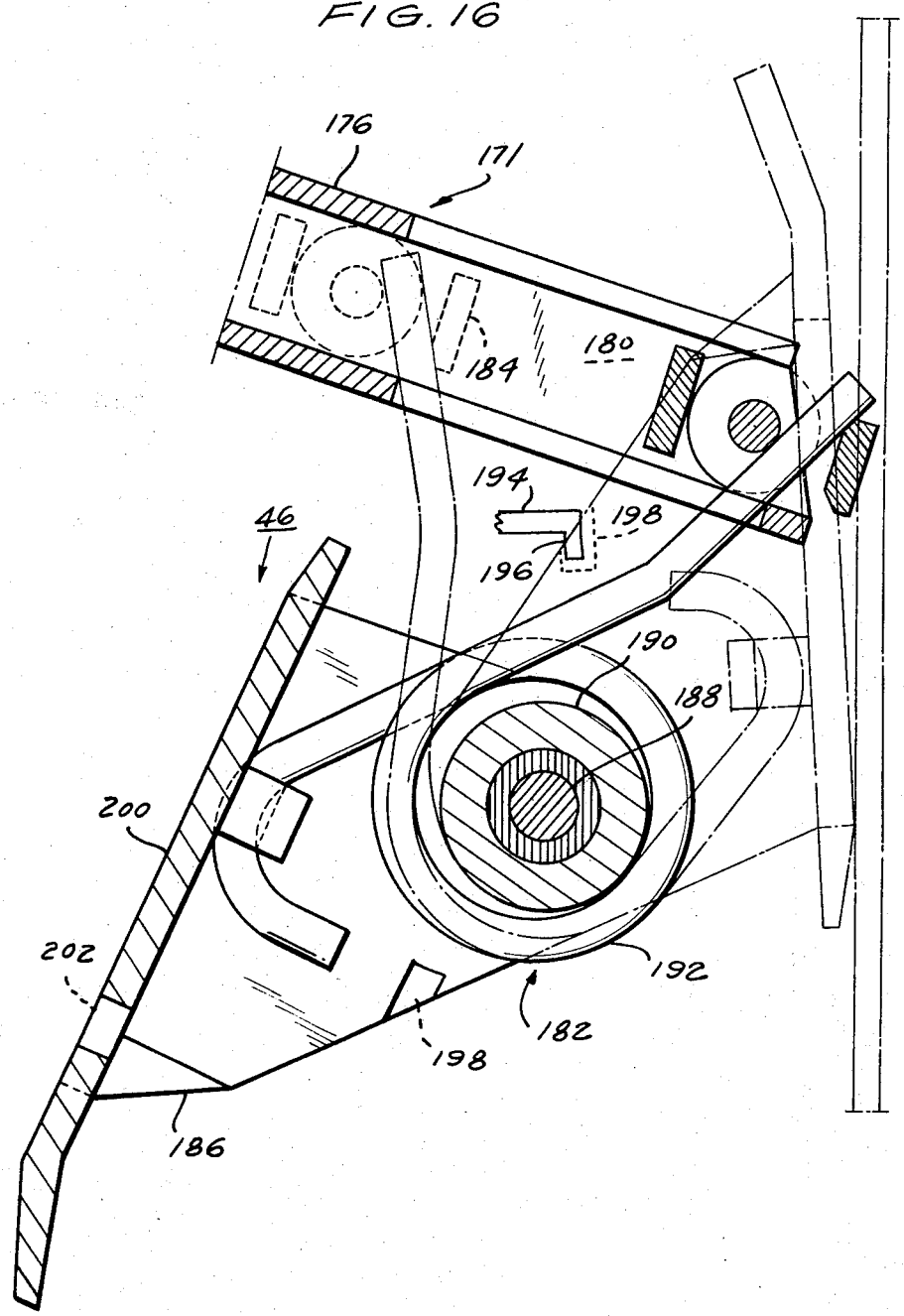

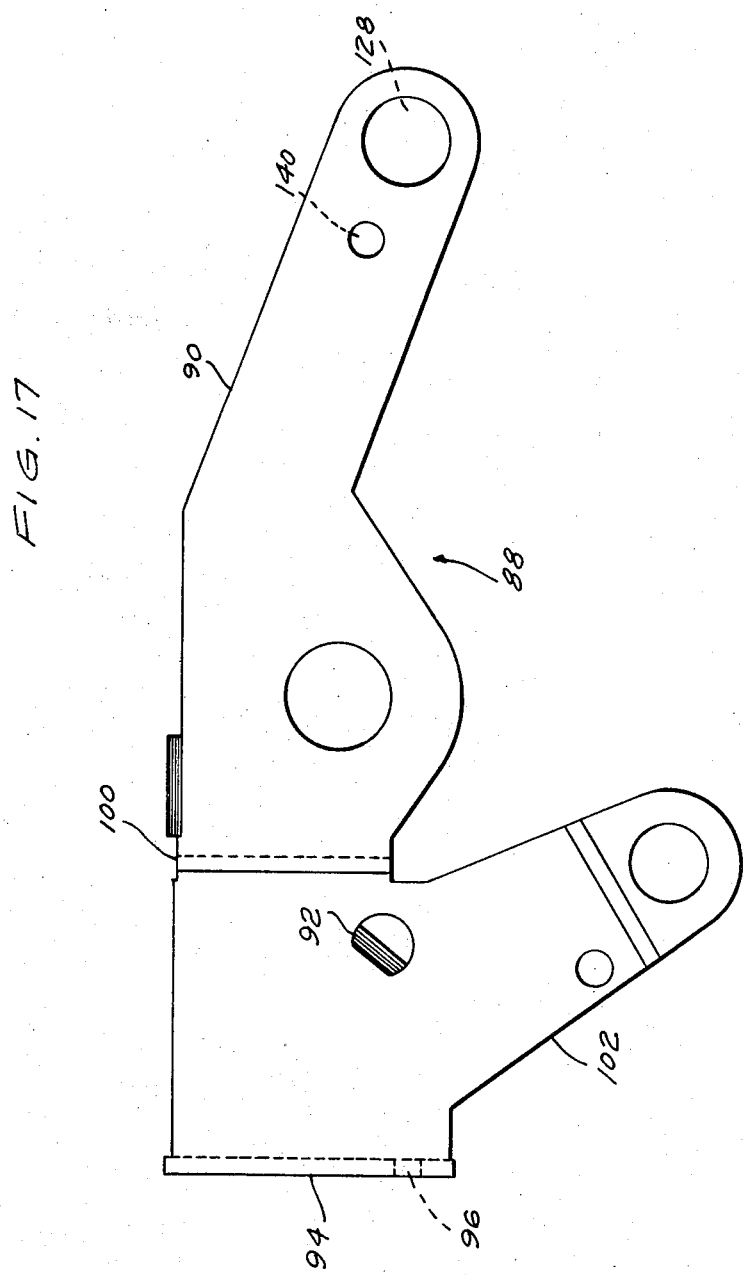

United States Patent Office 3,371,507
Patented Mar. 5, 1968

3,371,507
CIGARETTE LIGHTER
Stanley H. Newman, % Regency Hotel, Park Ave. at
61st St., New York, N.Y. 10021
Filed Oct. 23, 1965, Ser. No. 503,848
Claims priority, application France, Nov. 19, 1964,
995,510
3 Claims. (Cl. 67—7.1)

ABSTRACT OF THE DISCLOSURE

A cigarette lighter which uses a compressible gas as a fuel, the lighter having a sparkwheel and flint assembly which is rotated by means of a ratchet wheel activated by a pawl member and an activating lever, the activating lever also opening the valve to emit fuel, the mechanism for maintaining a flint in contact with the sparkwheel also serves as a device for holding the head mechanism in engagement with the container.

The present invention relates to cigarette lighters and more particularly to lighters which use a gaseous medium, such as butane, for a fuel.

In recent years gas lighters have become increasingly popular and, as a result, there has been a need for improved lighters and lighter mechanisms. Improved mechanisms are desirable since they afford more efficient use of the gaseous fuel which is more expensive than the old style liquid fuel.

An efficient lighter mechanism requires a sparkwheel construction which is positive acting. Improper spark wheel operation can only lead to a loss of gaseous fuel which escapes unlit while the sparkwheel malfunctions.

Also, for the convenience of the user, the flint should be easily replaced and, in addition, some means should be provided to indicate to the user when the flint is almost exhausted.

Another requirement for a good lighter mechanism is that the lighter be constructed so that sufficient mechanical advantage is provided to permit the ordinary user to depress the fingerpiece without the necessity of using unusual and great force.

Accordingly, it is an object of the present invention to provide an improved lighter which is not only reliable but, also, easy to use.

Another object of the present invention is to provide an improved lighter mechanism which mounts most of the mechanism on a single supporting frame, thus facilitating manufacture.

A further object is to provide a mechanism wherein the fingerpiece has an elongated lever arm to permit maximum mechanical advantage to be obtained when igniting the lighter.

Still another object of the present invention is to provide a lighter wherein the mechanism includes an outside flame regulating wheel which is operable from the upper wall of the lighter.

Yet a further object is to provide a lighter having a flint mechanism which permits easy and quick replacement of the flint.

From the drawings and the description herein the above objects and other advantages of the present invention will be obvious. However, it is to be understood that the illustrated embodiment and its description is for the purpose of illustration and for enlightenment of those skilled in the art. Other ways of carrying out the present invention will undoubtedly occur to those skilled in the art and such will be within the scope of the claims appended hereafter to this specification.

Figure 8:
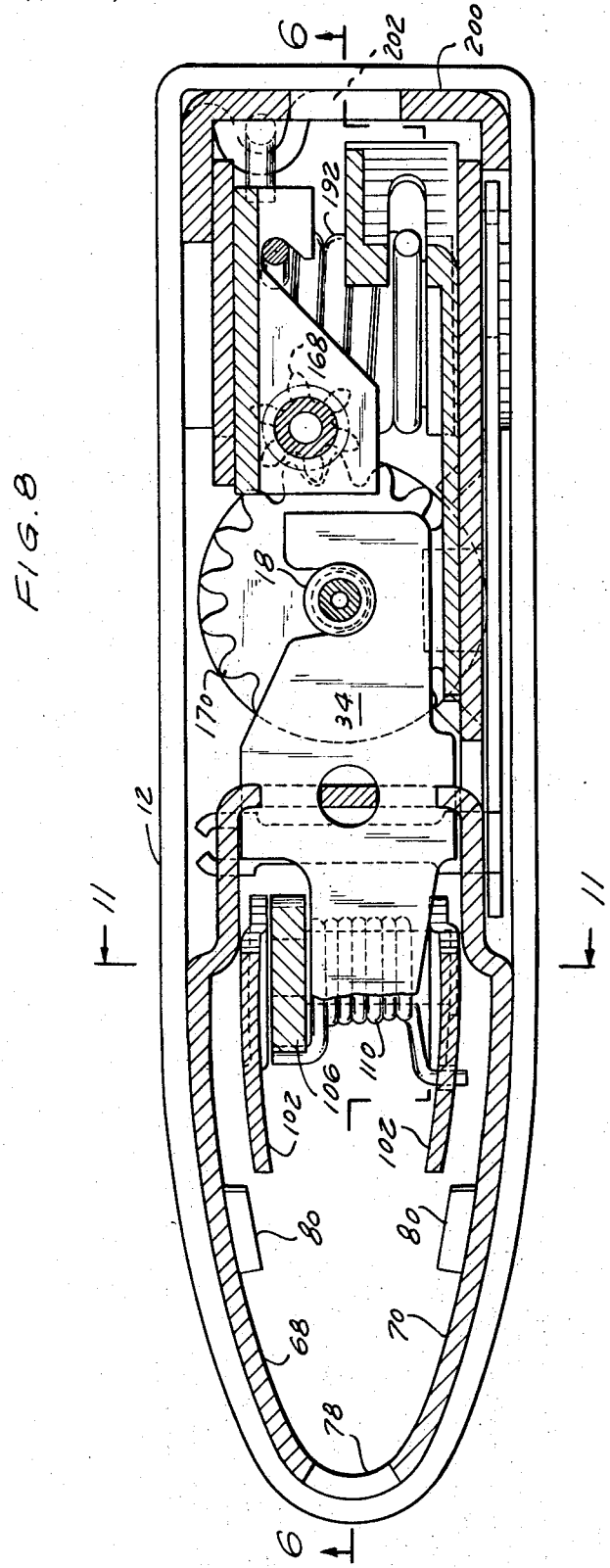
Figure 9:
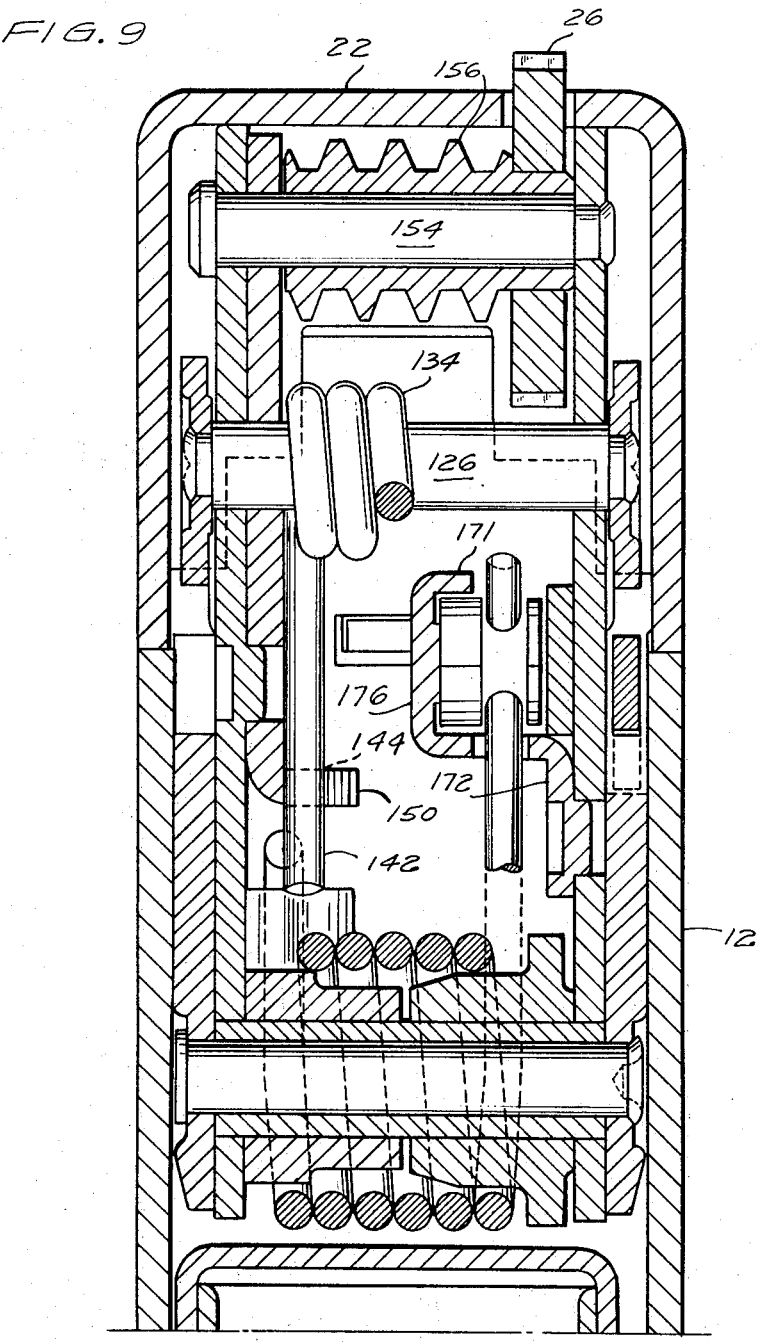
Figure 10:
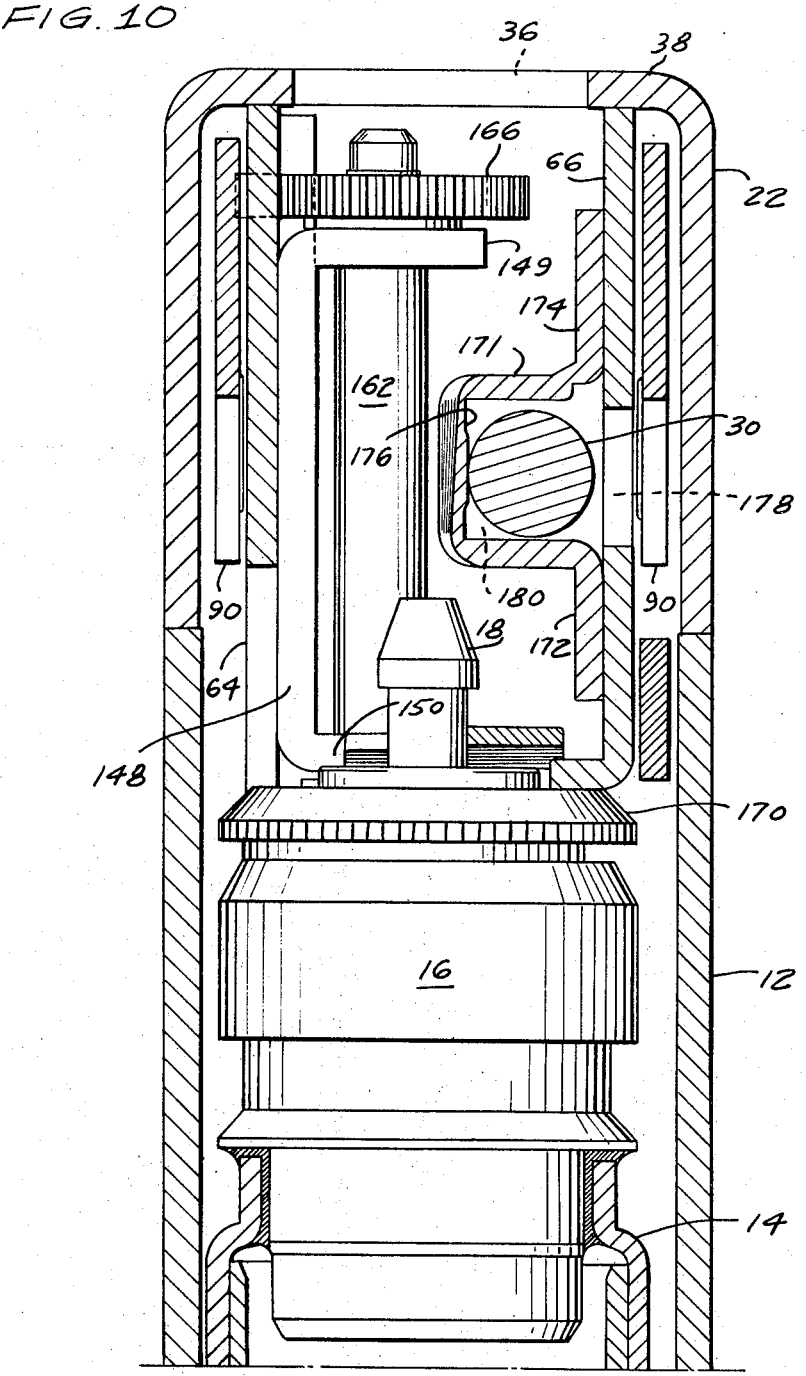
Figure 11:
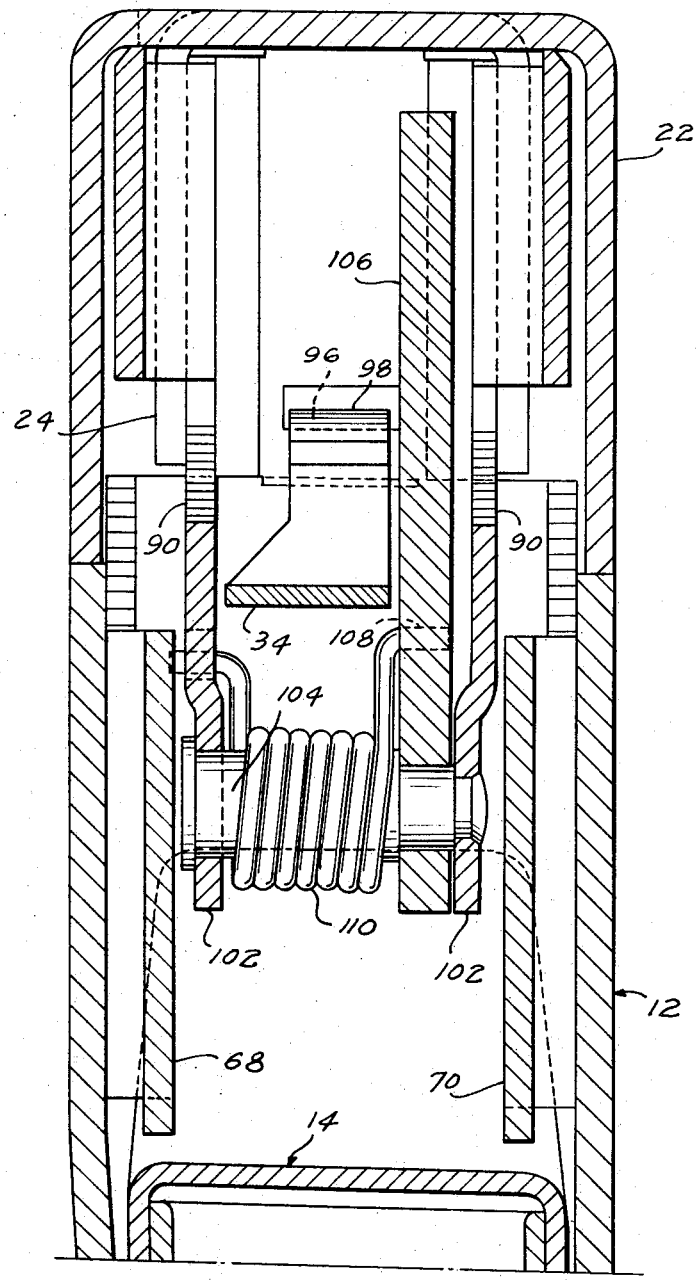
Figure 12:
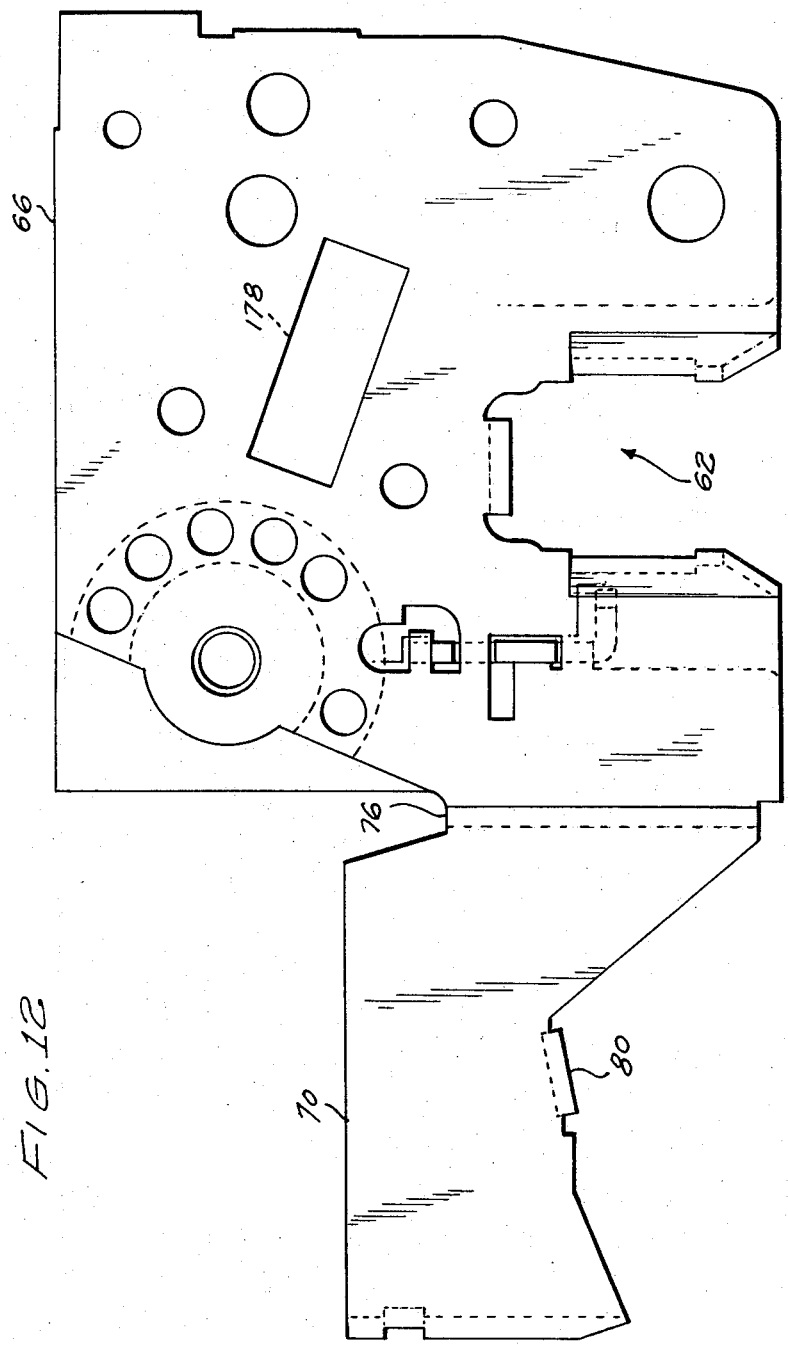
Figure 13:
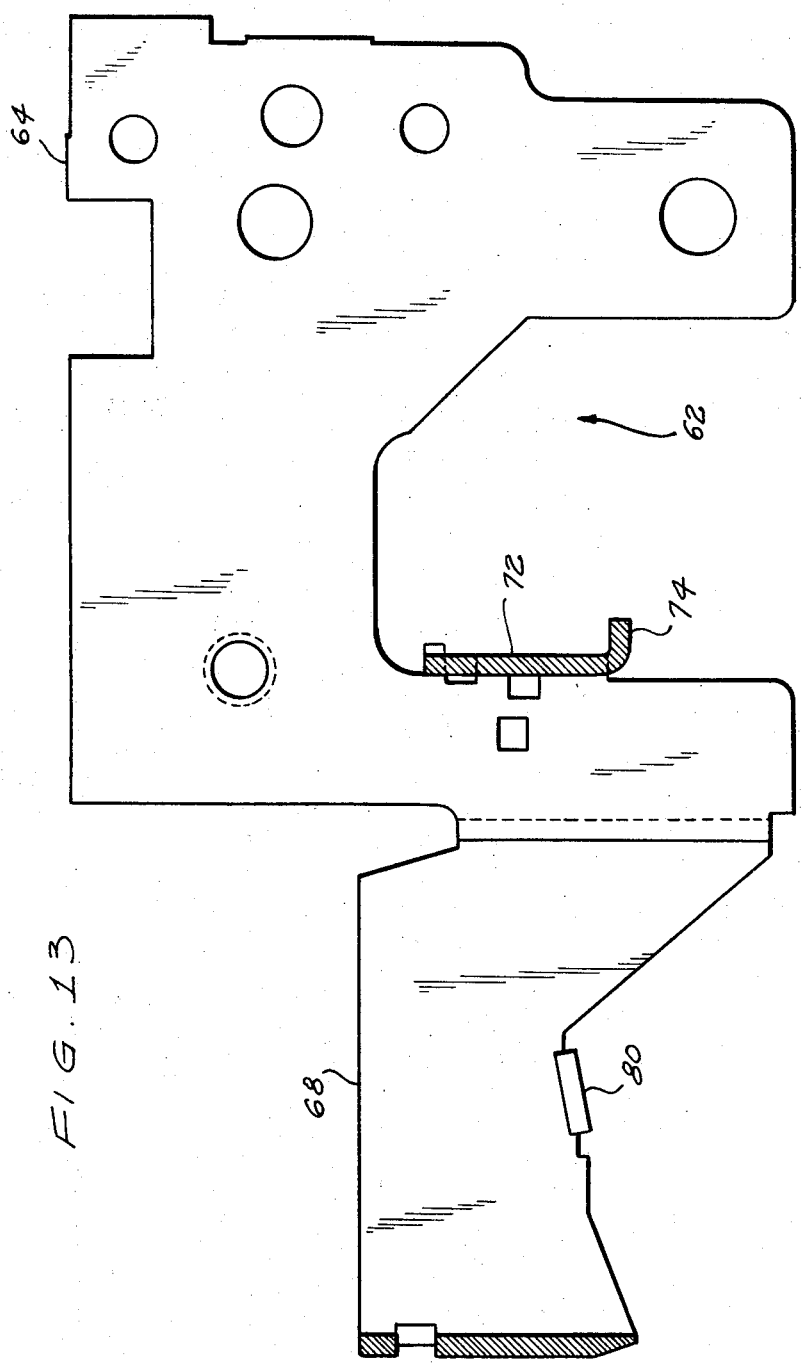

In the drawings:
FIGURE 1 is a side view of a lighter in accordance with the present invention;
FIGURE 2 is a rear view of the lighter of FIGURE 1;
FIGURE 3 is a top view of the lighter of FIGURE 1;
FIGURE 4 is a sectional schematic view of the head mechanism of the lighter of FIGURE 1;
FIGURE 5 is a partially fragmentary side view of the fuel tank and valve and burner of the lighter of FIGURE 1;
FIGURE 6 is an enlarged sectional side view of the head mechanism of the lighter of FIGURE 1;
FIGURE 7 is an enlarged partial sectional view of the head mechanism of FIGURE 6 taken along lines 7—7;
FIGURE 8 is an enlarged partial sectional view of the head mechanism of FIGURE 6 taken along lines 8—8;
FIGURE 9 is a transverse sectional view of the lighter head mechanism of FIGURE 6 taken along lines 9—9;
FIGURE 10 is another transverse sectional view of the lighter head mechanism of FIGURE 6 taken along lines 10—10;
FIGURE 11 is still another transverse sectional view of the lighter head mechanism of FIGURE 6 taken along lines 11—11;
FIGURE 12 is a longitudinal side view of the support frame of the head mechanism;
FIGURE 13 is a longitudinal sectional side view of the support frame of FIGURE 12;
FIGURE 14 is a sectional longitudinal side view of the cover piece for the head mechanism;
FIGURE 15 is a sectional plan view of the support frame of FIGURE 12 taken along lines 15—15;
FIGURE 16 is an enlarged fragmentary sectional view of the flint replacement mechanism;
FIGURE 17 is a longitudinal side view of the main lever arm of the lighter of the present invention; and
FIGURE 18 is a fragmentary, enlarged, longitudinal plan view of the upper portion of the flame adjustment mechanism.

As shown in FIGURES 1 to 5 in particular, the illustrated lighter 10 in accordance with the present invention comprises an outer housing 12, a replaceable tank 14 on which there are mounted an expansion valve 16, a burner 18, and a head mechanism assembly 20 including a cap 22, push member or fingerpiece 24, and a regulating wheel 26 for the valve 16. The head mechanism also comprises a knurled sparkwheel 28 turning in contact with a flint 30 contained in a flint-holder 32, a valve lifter 34 which lifts the head of the burner 18 to permit passage of the gaseous fuel, and a flame opening 36 in the top wall 38 of the cap 22.

In the present invention, as shown in FIGURE 6, the conventional sparkwheel drive system is replaced by a mechanism consisting primarily of a ratchet wheel 40 and a pawl 106 actuated by a pivoted lever 88 attached to the fingerpiece 24.

A spring loaded member 46 serves both to push the flint 30 into contact with the sparkwheel 28 and to lock the head assembly 20 onto the lower assembly consisting of the housing 12 and the tank 14.

The cap 22 has two symmetrical side walls 48 and a front end wall 50 and rear wall 52. At its rear, the top portion of the cap 22 curves downwardly and has an opening 54 to receive the fingerpiece 24. The end walls 50 and 52 each terminate at their lower portion in lugs 56 and 58 respectively. These lugs are directed inwardly and serve to lock the cap 22 onto the head mechanism. Toward the front of the cap, the upper wall 38 has a narrow rectangular opening 60 through which the flame regulating wheel 26 protrudes.

The head assembly 20 includes a main member to support the greater portion of the head mechanism and which will be referred to as the frame 62. The frame 62, as shown in FIGURE 15, has substantially, as seen in a horizontal section, the general shape of an A. The frame 62 has two flange-like plates 64 and 66 which form the open end of the A and these are connected with each other by a second pair of plates 68 and 70 of lesser height. The side plates have several cut-outs for various purposes as will be explained later. The plates are connected by a transverse vertical partition 72 and the partition 72 has a horizontally slightly curved flange 74 at its lower portion which stiffens the partition 72. The partition 72 is acually a continuation of the side plate 64 and at its terminal end connects to the other side plate 66. Where the open end plates join the second pair of plates 68 and 70 offsets 76 are provided. Furthermore, at its rear or the apex of the A, an opening 78 is provided to engage the lug 58 of the cap 22 and hold it in place.

Referring to FIGURES 6 to 11 in particular, the fingerpiece 24 has a vertical cross-section in the shape of an inverted U. The arms of the fingerpiece 24 are provided with holes 86 and these holes serve to permit the fingerpiece to be attached to a main actuating lever 88. The lever 88 is also of a generally U-shaped cross-section but in a horizontal plane. Lever 88 has two symmetrical arms 90 from which there extend inwardly projections 92. The projections 92 are inserted into the fingerpiece affixing it to the lever 88. The rear 94 of lever 88 has an opening 96 for the passage of the rear end 98 of the valve lifter 34. The arms 90 as they extend from the rear 88 have a slight offset 100 so that the open end of lever 88 is spaced wider apart than the portion adjacent to the rear 94.

Extending downwardly from the arms 90, and adjacent to the rear 94 are extensions 102. Stamped holes are provided near the lower end of the extensions 102 through which is inserted a pin 104. A pawl 106 having an opening 108 is rotatably mounted on the pin 104. A spring 110 connected to the pawl 106 and one extension 102 and coiled around the pin 104 urges the upper end 112 of the pawl forwardly.

As shown in FIGURE 6, the sparkwheel 28 is force-fitted on a hollow rod 114 connected to the ratchet 40 (which in this illustration has five teeth 116) which in turn is mounted on a hollow pin 118 which a rivet 120 holds between the side plates 64 and 66 with a supporting washer 122 interposed adjacent side plate 64 and a spacer washer 124 between the ratchet 40 and the sparkwheel. In order to assure a good drive while avoiding rotation of the sparkwheel 28 around the hollow pin 118, the end of the pin may be crimped on the sparkwheel. Drive notches may be provided in which the hollow pin 118 can engage.

To house the head of the rivet 120, the side plate 64 has a stamped recess and to house the riveted end, the other side plate 66 also has a stamped recess. In order to leave space for the sparkwheel, the side plate 66 has a clearance rim 124 stamped on its inner face.

The ratchet 40 cooperates with the spring loaded pawl 106 which is constantly urged by its spring 110 into engagement with the teeth of the ratchet. The pawl has a fixed position with respect to the lever 88 so that when the fingerpiece 24 is depressed the lever 88 is pivoted around a pin 126 and the pawl 106 is pulled downwardly. The depressing pawl then engages the ratchet 40 and turns the sparkwheel 28. The ratchet and pawl operation prevents the reverse return of the sparkwheel when the fingerpiece 24 and lever 88 are returned to an at rest position.

The pin 126 is riveted in place in holes 128 of the arms 90 of lever 88. Pin 126 also freely passes through holes 130 and 132 in side plates 64 and 66 respectively. A coil spring 134, one end 136 of which rests against a pin 138, is wound around the pin 126. The pin 138 is mounted in holes 140 in the arms 90. The other end 142 of spring 134 passes through a cutout 144 in an internal supporting member 146. The spring 134 therefore urges the lever 88 in a clockwise direction (as illustrated), that is to say, returns it to its at rest position shown when there is no pressure on the fingerpiece 24 and lever 88.

The member 146 supports the outer portions of a mechanism for adjusting the height of the flame and includes a vertical wall 148, an upper flange 149 and a lower flange 150.

The lower flange 150 has a cut-out 152 to receive the end 142 of the spring 134.

A pin 154 on which there are keyed a worm gear 156 and the flame regulating wheel 26 is mounted on the member 146 and the side plates 64 and 66. The pins 126 and 138 also pass through the vertical wall 148. An opening 158 is provided in the flange 150 and a second opening 160 is provided in the upper flange 149. In these openings 158 and 169 there is housed a countershaft 162 which bears toward its upper end 164 a countergear 166 in engagement with the worm 156 and at its lower end a counterpinion 168 (having in the illustrated embodiment six teeth). Friction washers are interposed between the gear 166 and the counterpinion 168 on the one hand and the support member 146 on the other hand. When the lighter is assembled, the pinion 168 meshes with a gear 170 borne by the valve 16 and this actuates the lower part (not shown) of the adjusting mechanism contained in the valve 16. Such internal valve adjusting mechanisms are well known to those skilled in the art.

The flint 30 is contained in the flint-holder 32 which will now be described in detail. As shown in FIGURES 4, 6, 10 and 16 in particular, the flint-holder 32 has generally a square inner cross-sectional shape and is open on one side.

The flint-holder includes a coverpiece 171 having a lower vertical flange 172 and an upper vertical flange 174, connected together by a U-shaped portion 176. The coverpiece 171 is mounted on the inner surface of side plate 66 of frame 62 and is positioned so that it is aligned with a rectangular opening 178 in plate 66.

The alignment of this passageway 180 through the U-shaped portion 176 is about 30° with the horizontal.

A flint is introduced into the passageway 180 through the rectangular opening 178. The positioned flint 30 can then be urged into contact with the sparkwheel 28 by a flint pushing device 182. This device includes a block-like member 184 which is slidable through the passageway 180.

Mounted on the lower portion of the side plates 64 and 66 is a U-shaped lever member 186. This member 186 is fixed onto a pin 188 which freely passes through openings in the plates 64 and 66 and also through a fixed hollow rod 190 which is mounted between the plates. A spring 192 is wound about rod 190 and one end is connected to the block member 184. The other end of the spring is affixed to the U-shaped lever 186.

As shown in FIGURES 6 and 16 in particular (when the lever 186 is swung upwardly the block 184 urges the flint 30 into contact with the sparkwheel 28.

To reload a flint, one need only swing the lever 186 downwardly retracting the block member 184 and exposing opening 178. A new flint is then dropped in and lever 186 swung upwardly.

To keep the spring loaded lever 186 in an upward position a locking arm 194 is mounted on the outer surface of plate 66. Arm 194 has a forward projection 196 which engages a cut-out 198 in lever 186, thus, holding the lever upright. By merely lifting projection 196 upwardly lever 186 is released and the flint may be unloaded.

The central wall 200 of lever 186 has a cutout 202 provided therein. The front lug 56 on cap 22 engages this cut-out to hold the cap in place. By allowing a little play in the projection 196 and cut-out 198 arrangement the cap 22 can be easily removed by merely urging the lever slightly counter-clockwise (in the illustrated embodiment).

It is apparent that the lever 186 serves the unique combination of locking the cap in place and also keeping the flint 30 in positive contact with the sparkwheel 28.

Operation

Operation of the lighter is relatively simple and yet the action is positive. By pushing downwardly on the fingerpiece 24, the lever 88 is caused to pivot. The pivoting lever 88 carries the pawl 106 down with it and, since the pawl is spring loaded against the ratchet 40, the ratchet is caused to rotate. The rotating ratchet in turn rotates the sparkwheel 28 generating a field of sparks.

At the same time the valve lifter 34 is also depressed at one end since it is connected to lever 88. However, the lifter is pivoted so that the other end will be raised. The free end of the lifter engages the head of the burner 18 and this causes the valve to open. Gas then streams onto and into the field of sparks. When the gas is ignited it produces a flame which burns through opening 36.

When pressure is released from the fingerpiece the pawl and lever 88 return to their at rest position and the valve 16 is closed.

To regulate the flame, major adjustments can most readily be made by turning the regulating gear on the valve. However, fine adjustments can best and most accurately and quickly be made by use of regulating wheel 26 and the worm gear and counterpinion arrangement.

From the foregoing, all the objects set forth hereinbefore as well as others and obvious advantages are accomplished by the present invention.

I claim:

1. A cigarette lighter of the type described herein comprising a casing containing a supply of gaseous fuel, a burner and valve mechanism connected to said container, a head mechanism including a sparkwheel, flint and activating lever positioned above said container and adjacent said burner and valve and a closure cap covering a portion of the head mechanism, the closure cap being attached to said mechanism by a fixed lug arrangement at one end thereof and by a lockable spring loaded latch member at the other end thereof of said cap, said latch spring adapted to maintain the flint in contact with the sparkwheel.

2. A cigarette lighter of the type which uses as a fuel a compressed inflammable gas, said lighter comprising a housing, a container within said housing having a supply of said fuel therein, a valve and burner combination communicating with said fuel supply, valve opening means, a head mechanism positioned adjacent to the valve and burner combination, said head mechanism including a support frame, a sparkwheel and flint assembly, an activating lever adapted for cooperation for said valve opening means, and sparkwheel drive means connecting said sparkwheel and said activating lever, said sparkwheel rotatably mounted on said support frame and in frictional contact with said flint, said sparkwheel drive means including a rotatable ratchet wheel fixedly connected to said sparkwheel at one side thereof and rotatable therewith, and a pawl member rotatably connected at one end to said activating lever and the opposite end portion of said pawl engageable with said ratchet whereby a field of sparks is generated adjacent to the burner when the activating lever is moved to cause said sparkwheel to rotate and to cause said valve opening means to open said valve thereby releasing fuel through said burner and into the field of sparks generated by the moving sparkwheel, a flint holder having a side opening therein and pivoted spring means mounted on the support frame, said means including a lever, a pivot member and a wound spring having one free end, the pivoted member mounted on the support frame, the lever and spring mounted on the pivot member, the free end of the spring adapted to be inserted into the flint holder, the other end of the spring in contact with the lever whereby the flint is placed in engagement with the sparkwheel and the lever is urged into engagement with the housing to maintain the head mechanism in position with respect to the housing.

3. In a cigarette lighter of the type described and including a housing, container in the housing for holding a supply of gaseous fuel and a head mechanism, an improved head mechanism including a flint and sparkwheel combination comprising a supporting frame, a sparkwheel rotatably mounted thereon and a flint-holder including a flint passageway having a side opening therein and flint support means movable in said passage to urge a flint into frictional contact with said sparkwheel, said means for urging said flint including a pivot member, a wound spring and a lever, said pivot member mounted on the support frame, the spring and lever mounted on the pivot member, the spring having one free end adapted to be inserted into the flint holder, the other end of the spring in contact with the lever whereby the flint is placed in engagement with the sparkwheel and the lever is urged into engagement with the housing to maintain the head mechanism in position with respect to the housing.

References Cited

UNITED STATES PATENTS

| 2,791,110 | 5/1957 | Gellman | 67—7.1 |
| 2,805,565 | 9/1957 | Racek | 67—7.1 |
| 2,943,471 | 7/1960 | Newman | 67—7.1 |
| 3,134,251 | 5/1964 | Gellman | 67—6.1 |
| 3,149,484 | 9/1964 | Kobayashi | 67—7.1 |
| 3,213,648 | 10/1965 | Racek | 67—7.1 |
| 3,222,894 | 12/1965 | Gellman | 67—7.1 |

FOREIGN PATENTS 926,701  6/1955  Germany.

EDWARD J. MICHAEL, *Primary Examiner.*